(12) United States Patent
Ishioka et al.

(10) Patent No.: US 6,277,248 B1
(45) Date of Patent: Aug. 21, 2001

(54) OZONE PRODUCTION FACILITIES AND METHOD OF THEIR OPERATION

(75) Inventors: Hisamichi Ishioka; Sanae Suzuki; Makoto Toraguchi, all of Kawasaki (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/478,218

(22) Filed: Jan. 5, 2000

Related U.S. Application Data

(62) Division of application No. 08/883,326, filed on Jun. 26, 1997, now Pat. No. 6,027,700.

(30) Foreign Application Priority Data

Jul. 2, 1996 (JP) .................................................. 8-171921

(51) Int. Cl.[7] .................................................. B01J 19/08
(52) U.S. Cl. ........................................ 204/176; 422/186.07
(58) Field of Search ........................ 204/176; 422/186.07

(56) References Cited

U.S. PATENT DOCUMENTS 5,520,887 * 5/1996 Shimuzi et al. ................ 422/186.07

FOREIGN PATENT DOCUMENTS 07247102   9/1995   (JP) .
08026704   1/1996   (JP) .

* cited by examiner

*Primary Examiner*—Kishor Mayekar
(74) *Attorney, Agent, or Firm*—Venable; Robert J. Frank

(57) ABSTRACT

A method of operating ozone production facilities comprises supplying a starting gas from oxygen production facilities alone to an ozonizer when the consumption of oxygen is within the production capacity of the oxygen production facilities; or mixing pure oxygen gas from liquid oxygen facilities with the gas from the oxygen production facilities, and supplying the resulting mixed gas as the starting gas to the ozonizer, when the consumption of oxygen exceeds the production capacity of the oxygen production facilities. Thus, the ozone production facilities, even if small in scale, can always supply an ozone-containing gas having an arbitrary ozone concentration, ranging from the maximum to a lower concentration.

9 Claims, 9 Drawing Sheets

OZONE PRODUCTION FACILITIES AND METHOD OF THEIR OPERATION

This application is a division of application Ser. No. 08/883,326 filed Jun. 26, 1997, now U.S. Pat. No. 6,027,700.

BACKGROUND OF THE INVENTION

1. Field of the Invention

This invention relates to ozone production facilities employing an ozonizer for generating ozone for use in the treatment of clean water and sewage, as well as the bleaching of pulp; and a method of operating the facilities.

2. Description of the Prior Art

FIG. 1 is a block diagram of conventional ozone production facilities. A starting gas 11 (main component: oxygen) prepared by oxygen production facilities 2 is supplied to an ozonizer 3. Ozone 12 generated by the ozonizer 3 is fed to ozone treatment facilities (not shown; e.g., facilities for sewage disposal and pulp bleaching). The concentration of ozone is monitored with an ozone analyzer 4. The amount of ozone generated is calculated by multiplying the flow rate of oxygen (monitored with an oxygen flowmeter 6) supplied to the ozonizer 3 by the ozone concentration.

FIG. 2 is a block diagram of PSA (pressure swing adsorption) type oxygen production facilities, an example of oxygen production facilities. Air in the atmosphere is pressurized by an air blower 32, and fed to one adsorption tower 31 with valves 35 and 37 being opened (with valves 35a and 37a being closed). The adsorption tower 31 is filled with an adsorbent, which adsorbs and removes moisture, carbon dioxide and nitrogen in the air selectively. Oxygen that is minimally adsorbed (the starting gas 11) passes as such through the adsorption tower 31. Then, the oxygen is pressurized to a desired pressure by a compressor 34, and supplied to an ozonizer 3. As the adsorption proceeds, no further moisture, carbon dioxide and nitrogen can be removed. At this time, the valves 35 and 37 are closed, while other valves 35a and 37a are opened to switch from the adsorption tower 31 to another adsorption tower 31a. Simultaneously, a valve 36 is opened to vacuumize the adsorption tower 31 by means of a vacuum pump 33. As a result, adsorbed gas components 13 comprising the adsorbed moisture, carbon dioxide and nitrogen are discharged, whereby the adsorbent is regenerated. By so using the adsorption towers alternately, oxygen can be produced continuously.

FIG. 3 is a graph showing the oxygen concentration as a function of the flow rate of oxygen produced by the oxygen production facilities. The oxygen concentration depends on the flow rate of oxygen and the amount of the adsorbent, and decreases as the flow rate of oxygen increases. For example, let the flow rate of oxygen be 1 for a maximum concentration of 95%. At a relative flow rate of 1.5, the oxygen concentration decreases to 60%.

FIGS. 4A and 4B schematically show a double pipe ozonizer, with FIG. 4A being a sectional view in a direction parallel to the common axis, and FIG. 4B, a sectional view in a direction perpendicular to the common axis. The double pipe ozonizer has a cylindrical stainless steel housing 101, which houses a cylindrical stainless steel ground electrode 102 disposed coaxially, and glass as a dielectric layer 103 in intimate contact with the inner surface of the ground electrode 102, both ends of the ground electrode 102 and the dielectric layer 103 being fixed to the housing 101. At the center of this ozone generation tube, a cylindrical stainless steel high-voltage electrode 104 is coaxially disposed so as to be separated from the surface of the dielectric layer 103 by a discharge space 105. A power source connector portion attached to a part of the electrode 104 extends to the outside of the housing 101, passes through a bushing 106, and becomes connected to one end of the housing 101 through a high frequency power source 107. At the center of both side surfaces of the housing 101, capillaries 111 are passed and fixed. These capillaries 111 are connected to the cylindrical high-voltage electrode 104 via insulating tubes 109. By this arrangement, cooling water 108 is flowed into the high-voltage electrode 104 in the directions of the arrows in the drawing. Cooling water 108 is also introduced from the outer peripheral surface of the housing 101 to cool the ground electrode 102.

From one end of the discharge space 105 of the double pipe ozonizer, the starting gas 11, produced by the aforementioned oxygen production facilities, is supplied. An exhaust valve 110 provided at the other end of the discharge space 105 is adjusted to set the absolute pressure at, approximately, 1.6 atmospheres. An alternating current is applied between the ground electrode 102 and the high-voltage electrode 104 by the high frequency power source 107. As a result, a silent discharge occurs to generate ozone 12. The concentration of the generated ozone 12 is monitored with an ozone analyzer 4. The ozonizer facilities in actual use have several hundred electrodes arranged, therein but their basic structure is the same as the ozonizer illustrated here.

The above ozone production facilities posed the following problems:

Generation of ozone in a large amount requires a large amount of oxygen, the starting material, which in turn requires large-scale and high-cost oxygen production facilities.

Increasing the flow rate of oxygen to the maximum capacity of the oxygen production facilities decreases the concentration of oxygen produced, and also lowers the concentration of ozone.

The concentration of ozone generated by the ozone production facilities is more than 200 g/m$^3$, which is applicable to pulp bleaching. In the treatment of clean water and sewage, the ozone concentration must be reduced to about 100 g/m$^3$.

SUMMARY OF THE INVENTION

In the light of the above-described problems, the object of the present invention is to provide ozone production facilities which can generate a large amount of ozone, which can always supply an ozone-containing gas having an arbitrary ozone concentration ranging from the maximum to a lower concentration, and which are small in scale.

To attain the above object, the ozone production facilities of the present invention comprise oxygen production facilities as a starting gas supply source, an ozonizer, and an ozone analyzer, and are adapted to supply the starting gas by the oxygen production facilities, ozonize the starting gas by the ozonizer to produce an ozone-containing gas, and monitor the ozone concentration of the ozone-containing gas by the ozone analyzer; the ozone production facilities further including liquid oxygen facilities as another starting gas supply source, and an oxygen flowmeter for monitoring the flow rate of oxygen supplied by the liquid oxygen facilities.

Preferably, the ozonizer is a double pipe ozonizer.

The ozone production facilities have piping for mixing part of the nitrogen exhausted from the oxygen production facilities with the ozone-containing gas, a nitrogen flowmeter for monitoring the flow rate of nitrogen, and a valve for adjusting the flow rate of nitrogen.

Alternatively, the ozone production facilities have piping for mixing air in the atmosphere compressed by a fan with the ozone-containing gas, an air flowmeter for monitoring the flow rate of air, and a valve for adjusting the flow rate of air.

A method of operating the ozone production facilities comprises supplying the starting gas from the oxygen production facilities alone to the ozonizer when the consumption of oxygen is within the production capacity of the oxygen production facilities; or mixing pure oxygen gas from the liquid oxygen facilities with the gas from the oxygen production facilities, and supplying the resulting mixed gas as the starting gas to the ozonizer, when the consumption of oxygen exceeds the production capacity of the oxygen production facilities.

The above method of operation sets the oxygen concentration of the starting gas at 95±5% when the starting gas is supplied only by the oxygen production facilities.

Alternatively, the oxygen concentration of the starting gas is set at 95±5% when the starting gas is supplied by both of the oxygen production facilities and the liquid oxygen facilities.

The above and other objects, effects, features and advantages of the present invention will become more apparent from the following description of embodiments thereof taken in conjunction with the accompanying drawings.

BRIEF DESCRIPTION OF THE DRAWINGS

FIG. 4A is a sectional view of a double pipe ozonizer in a direction parallel to the common axis, while

DETAILED DESCRIPTION OF THE PREFERRED EMBODIMENTS

Embodiment 1

Figure 1:
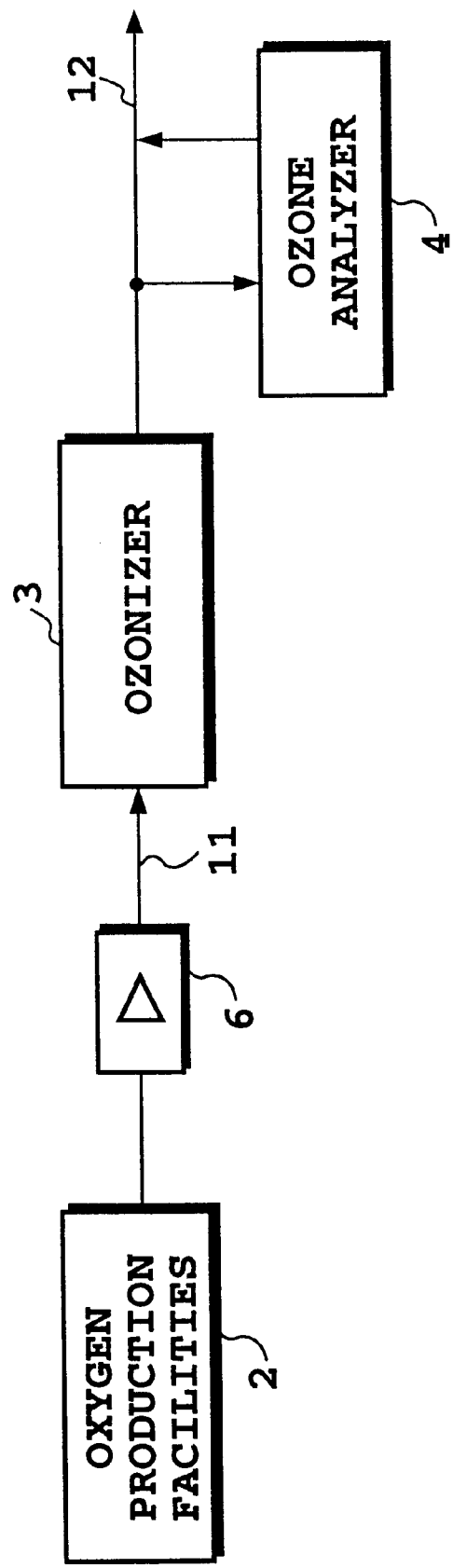
FIG. 1 is a block diagram of conventional ozone production facilities.
Figure 2:
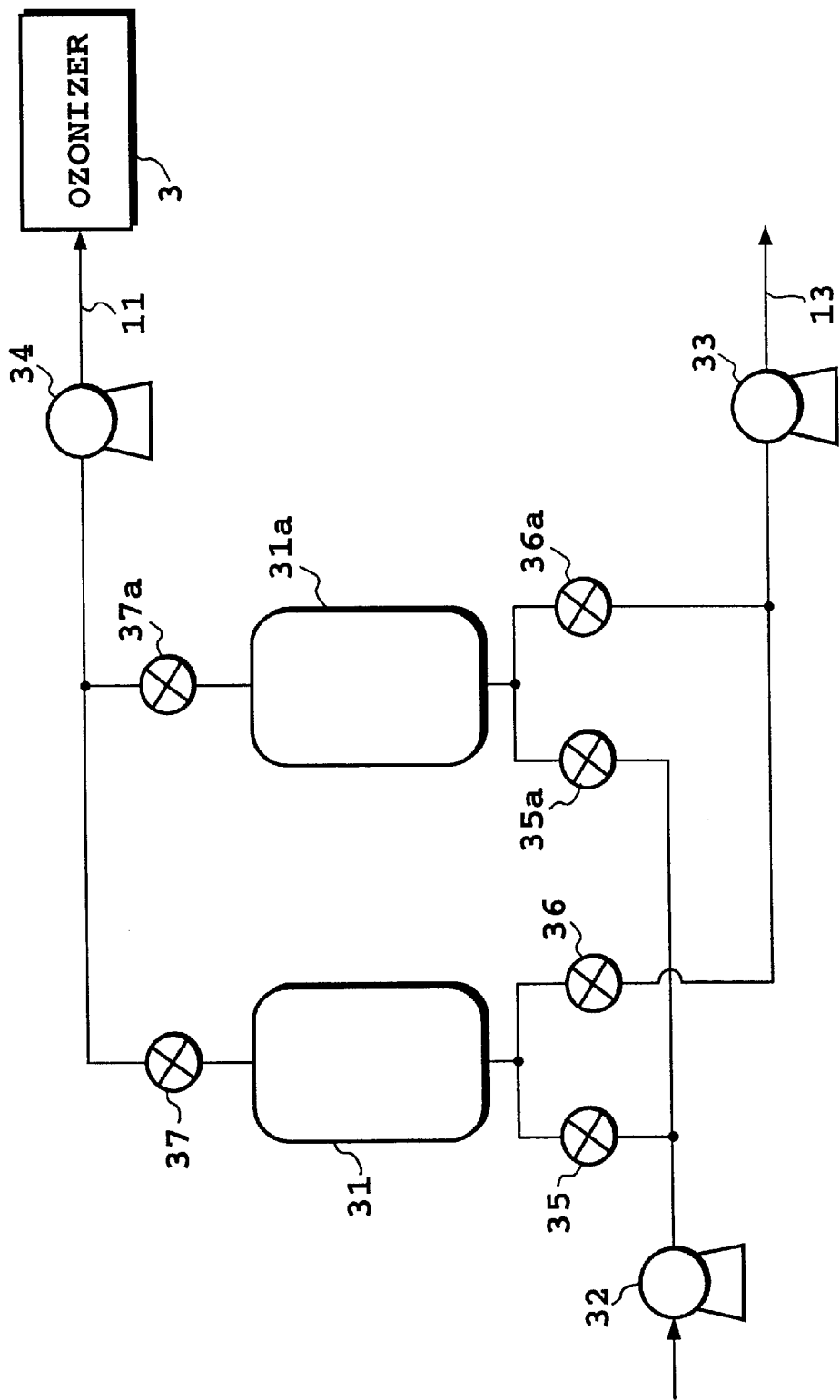
FIG. 2 is a block diagram of PSA (pressure swing adsorption) type oxygen production facilities, an example of oxygen production facilities.
Figure 3:
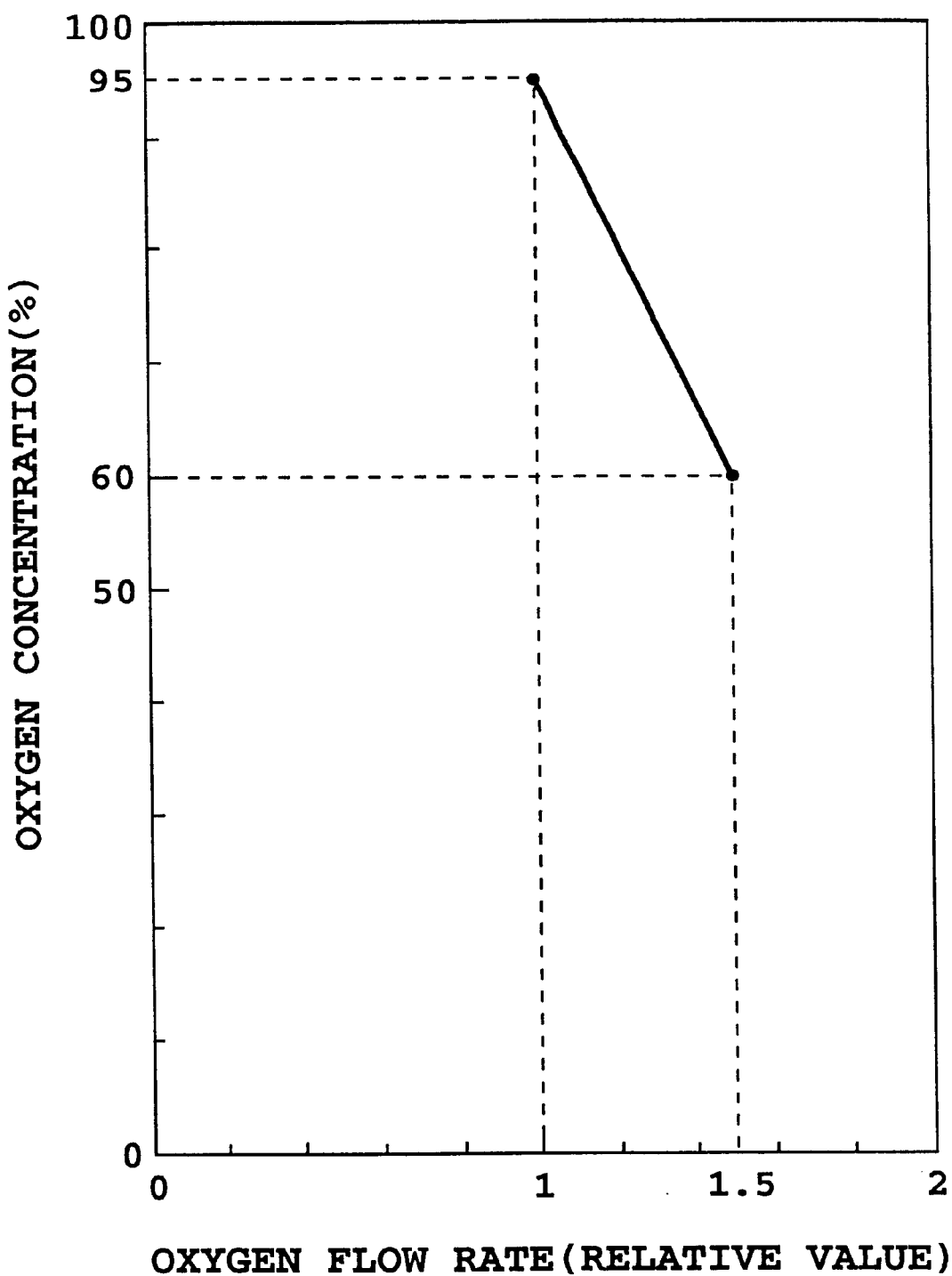
FIG. 3 is a graph showing the oxygen concentration as a function of the flow rate of oxygen produced by oxygen production facilities.
Figure 4A:
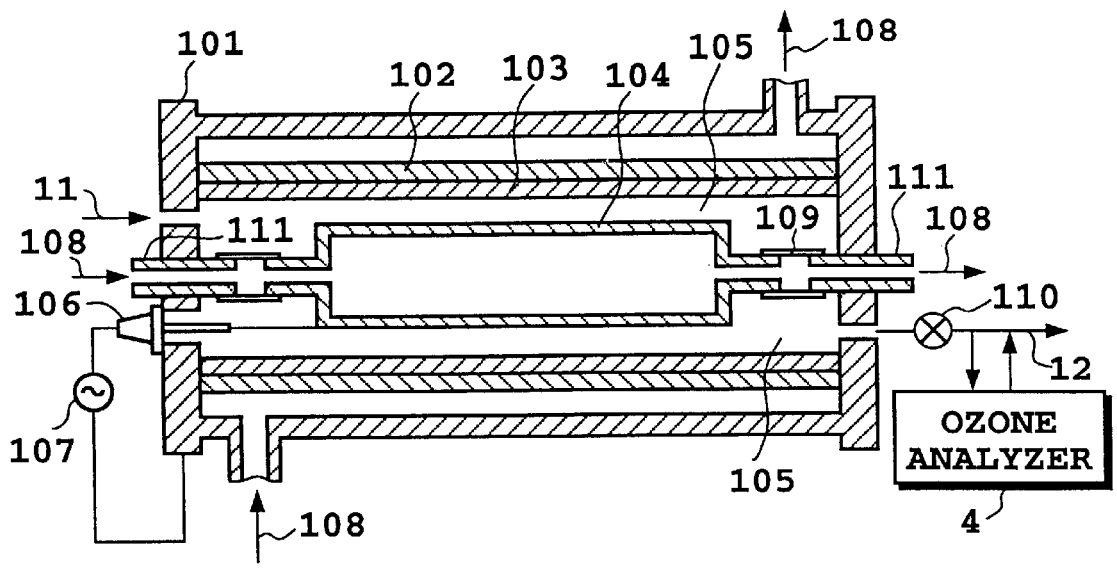
Figure 4B:
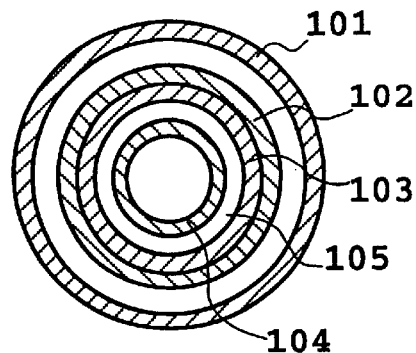
FIG. 4B is a sectional view of the double pipe ozonizer in a direction perpendicular to the common axis.
Figure 5:
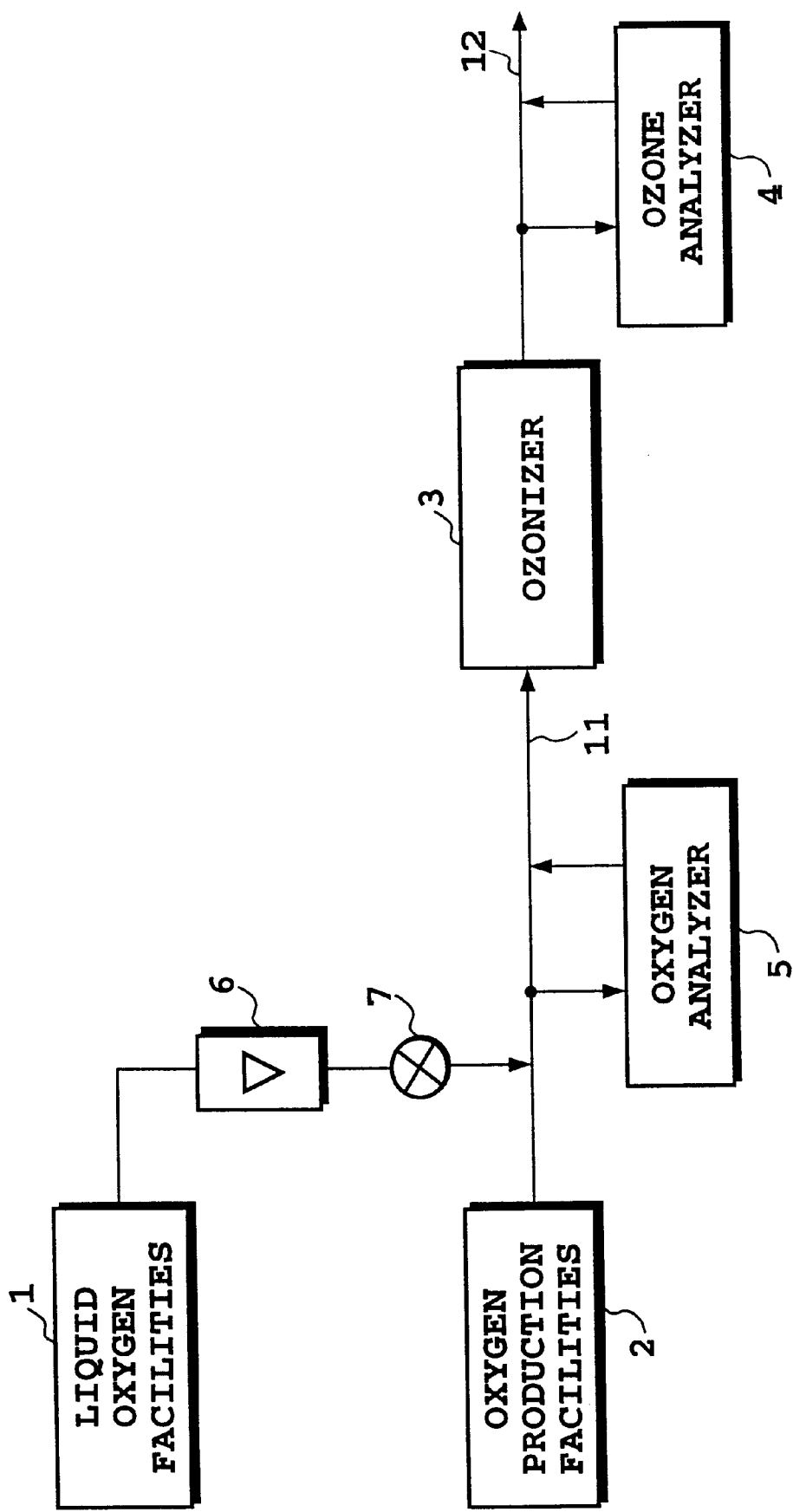
FIG. 5 is a block diagram showing the system configuration of ozone production facilities concerned with the present invention.

FIG. 5 is a block diagram of ozone production facilities concerned with the present invention. The ozone production facilities have an oxygen supply source consisting of liquid oxygen facilities 1 in addition to conventional oxygen production facilities 2. Pure oxygen supplied by the liquid oxygen facilities 1 is joined into piping from the oxygen production facilities 2 via an oxygen flowmeter 6 and a valve 7. An oxygen analyzer 5 is added to the joined piping to monitor the concentration of oxygen to be fed to an ozonizer 3. The liquid oxygen facilities 1 comprise a large Dewar vessel and an evaporator. The facilities 1 store liquid oxygen in the Dewar vessel, adjust the pressure of oxygen, evaporating from the liquid oxygen, by the evaporator, and supply the adjusted oxygen. The liquid oxygen stored is delivered into the Dewar vessel separately, for example, by a tank lorry.

When the consumption of oxygen is within the production capacity of the oxygen production facilities 2, the valve 7 is closed, and oxygen is supplied by the oxygen production facilities 2 alone. When the consumption of oxygen exceeds the production capacity of the oxygen production facilities 2, the valve 7 is opened, and a supplementary amount of oxygen covering the deficit can be supplied from the liquid oxygen facilities 1 to the ozonizer 3.

Figure 6:
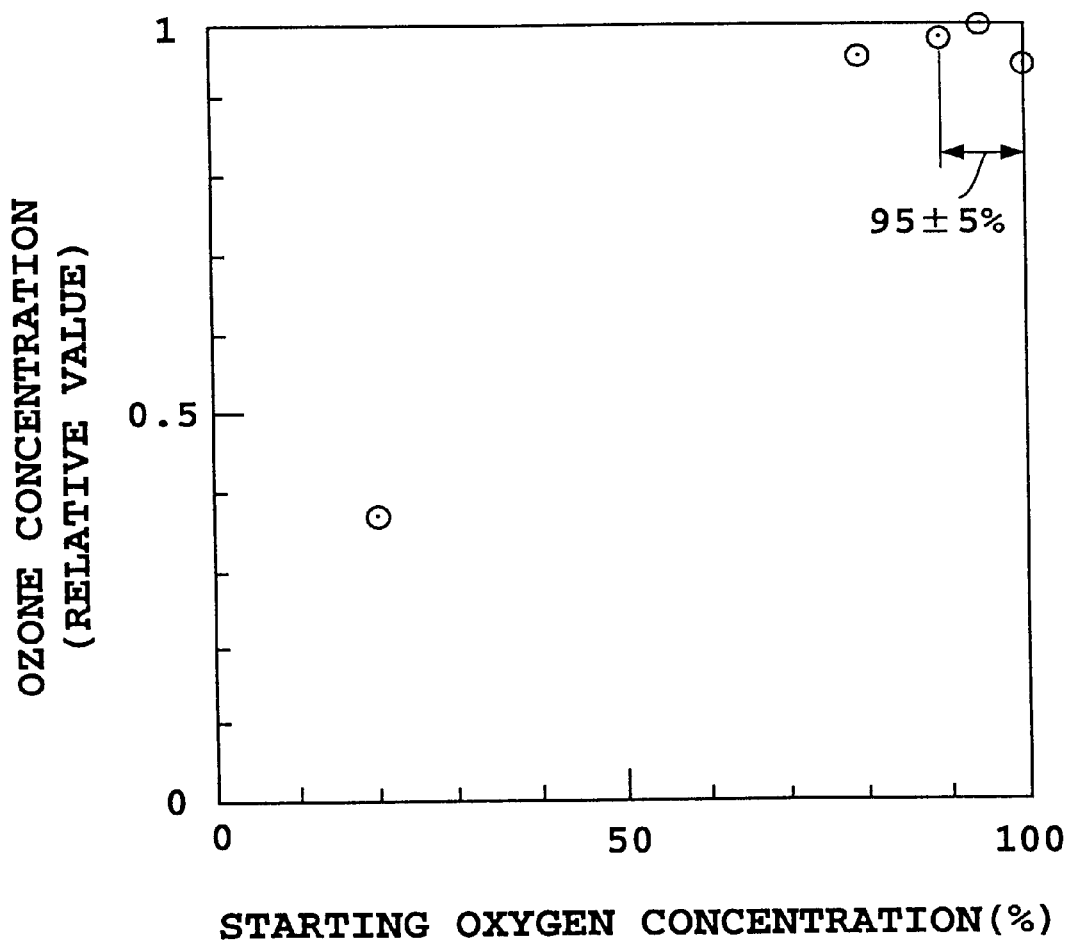
FIG. 6 is a graph showing the relative values of the ozone concentration versus the oxygen concentration of the starting gas in the ozonizer.

The effects of the present invention will be described after the characteristics of the ozonizer are explained. FIG. 6 is a graph showing the relative values of the ozone concentration versus the oxygen concentration of the starting gas in the ozonizer. An oxygen concentration of 20% corresponds to the use of air as the starting gas, while an oxygen concentration of 100% corresponds to the use of pure oxygen as the starting gas. Other experiments involving the use as the starting gas of mixtures of nitrogen and 80, 90 and 95% of oxygen were also conducted.

FIG. 6 shows that as the oxygen concentration increases, the ozone concentration increases, and the ozone concentration peaks at an oxygen concentration of about 95%. Thus, ozone can be generated efficiently when the oxygen concentration of the starting gas fed to the ozonizer is set at 95±5%.

When the oxygen supply capacity of the oxygen production facilities is more than the required oxygen flow rate, only the oxygen production facilities are used. At the same time, the oxygen flow rate is adjusted with the oxygen concentration being monitored with the oxygen analyzer. Thereby, the oxygen concentration can be maintained at 95±5%.

Figure 7:
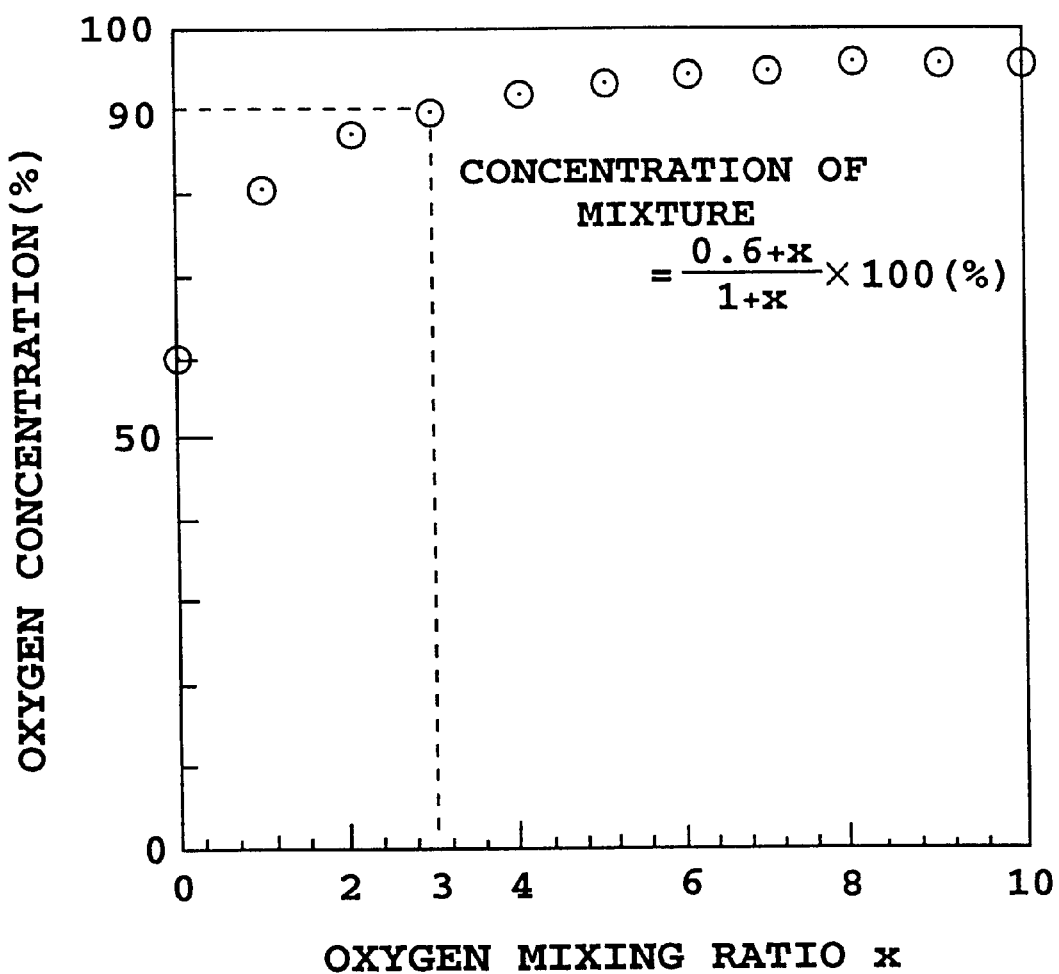
FIG. 7 is a graph showing the relation between oxygen concentration and the oxygen mixing ratio in the ozone production facilities concerned with the present invention.

As discussed with regard to the prior art, however, when the flow rate of oxygen is increased to the limit of the production capacity of the oxygen production facilities, the oxygen concentration decreases. In this situation, according to the ozone production facilities of the present invention, 100% pure oxygen is supplied from the liquid oxygen facilities 1, and mixed with the gas in the piping from the oxygen production facilities 2. In this manner, the oxygen concentration of the starting gas fed to the ozonizer 3 can be adjusted to 95±5%. For instance, oxygen with a purity of 100% is mixed by a flow rate of x×Q with oxygen having a flow rate of Q and a concentration of y %. In this case, the oxygen concentration, z %, of the mixture is $[(y \times Q + x \times Q)/(Q + x \times Q)] \times 100(\%)$. Using this equation, x to give z>95 is calculated. FIG. 7 is a graph showing the relation of the oxygen concentration with the oxygen mixing ratio in the ozone production facilities concerned with the present invention. As an example, a plot of z against x=1, 2, 3 . . . with y=60 is given.

This graph reveals that when x>3, the oxygen concentration can be adjusted to 95±5%. Here, the concentration of oxygen produced by the oxygen production facilities 2 need not be set at 60%, and the above theory holds true even when the oxygen concentration is intermediate.

In this manner, the transient shortage of oxygen supply by the oxygen production facilities 2 can be solved.

Embodiment 2

Figure 8:
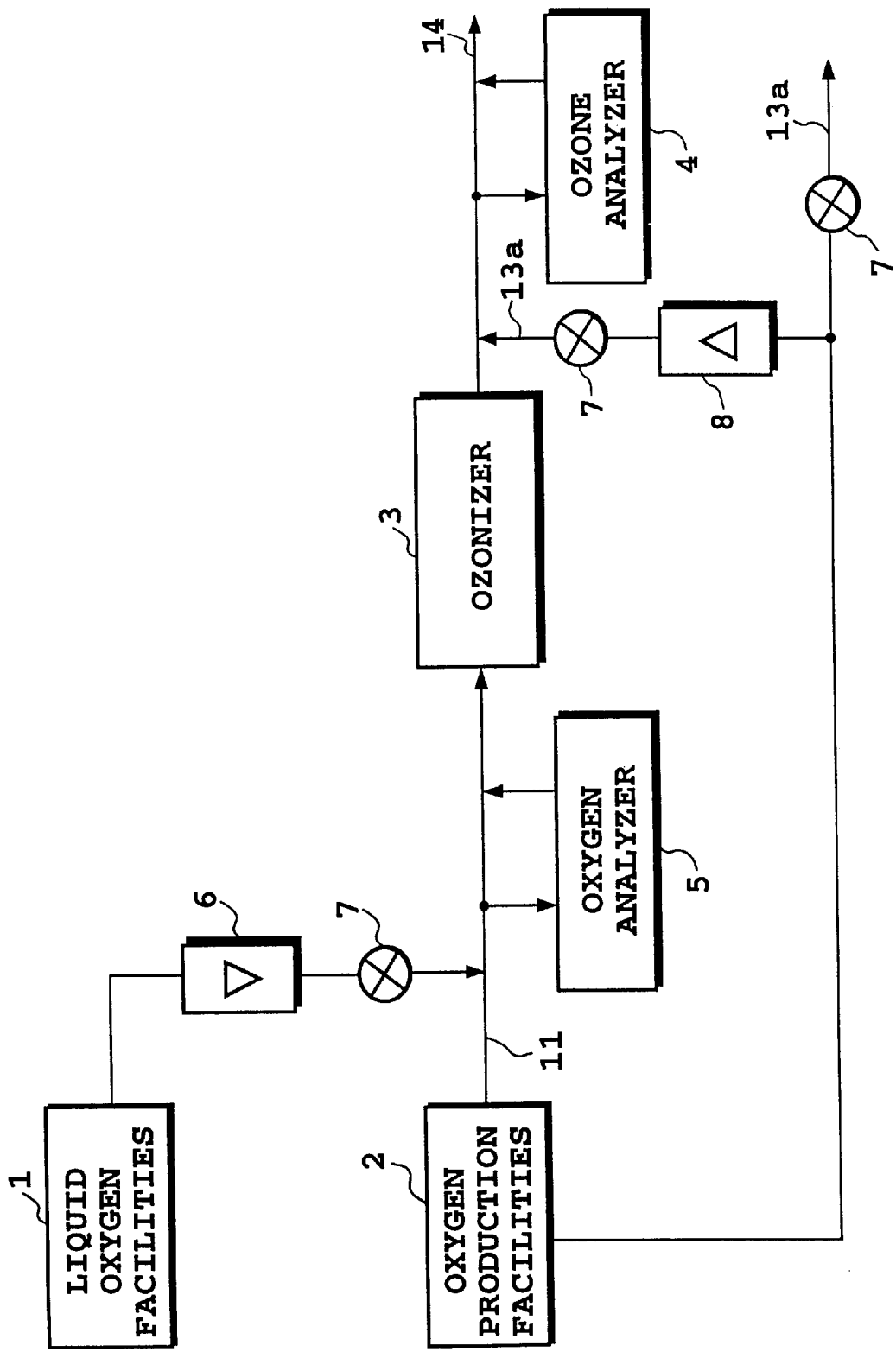
FIG. 8 is a block diagram showing the system configuration of other ozone production facilities concerned with the present invention.

FIG. 8 is a block diagram showing the system configuration of other ozone production facilities concerned with the present invention. Part of nitrogen gas 13a exhausted from oxygen production facilities 2 is used as a diluent gas. This diluent gas is mixed with ozone generated by an ozonizer 3, whereby an ozone-containing gas 14 of a desired ozone concentration can be obtained.

The flow rate of nitrogen gas 13a is adjusted by a valve 7 under monitoring with a nitrogen flowmeter 8. If the concentration of ozone generated by the ozonizer 3 is 200 g/m$^3$, for example, this ozone is mixed with nitrogen gas at a flow rate ratio of 1:1, whereby the ozone concentration can be adjusted to about 100 g/m$^3$.

Embodiment 3

Figure 9:
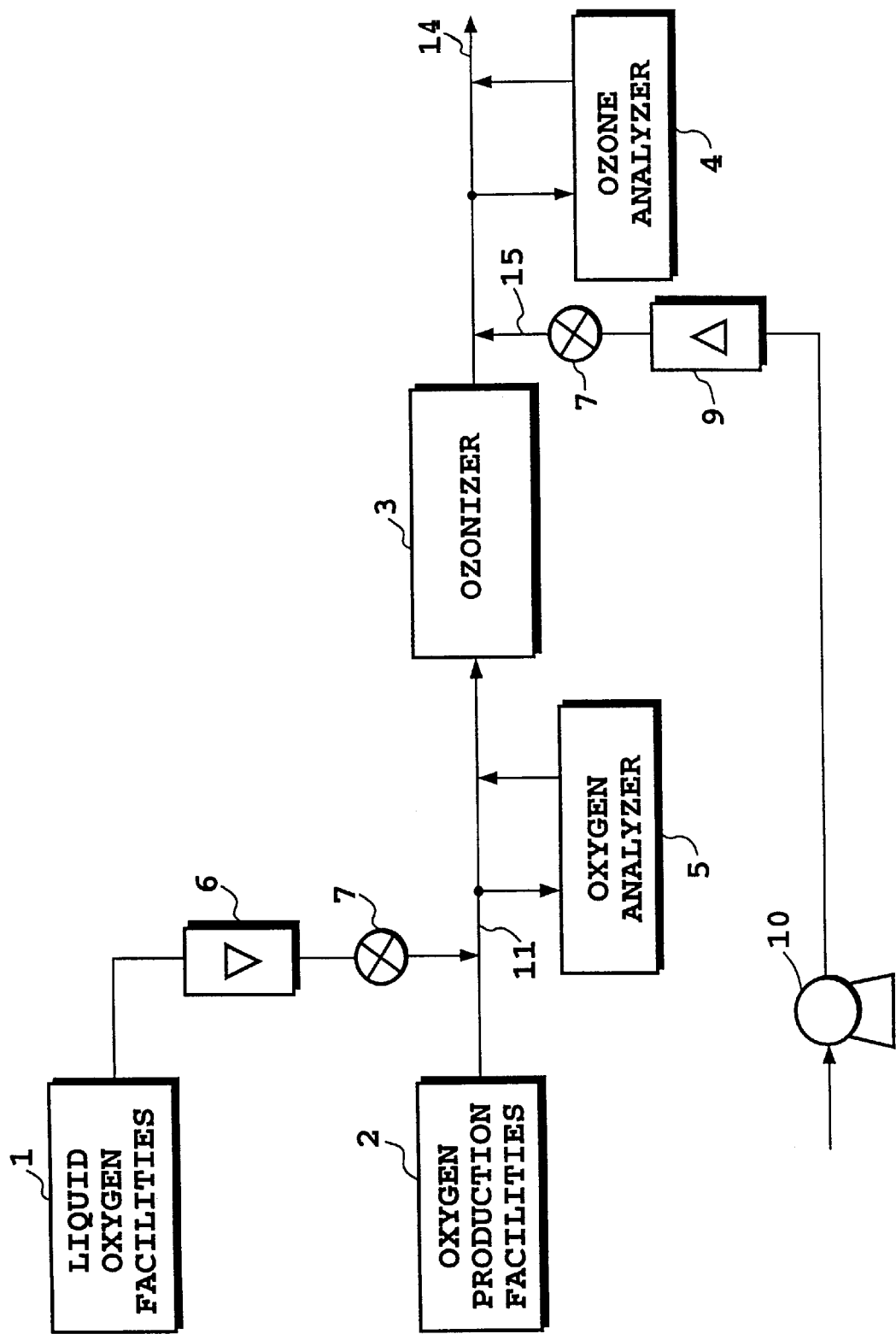
FIG. 9 is a block diagram showing the system configuration of alternative ozone production facilities concerned with the present invention.

FIG. 9 is a block diagram showing the system configuration of alternative ozone production facilities concerned with the present invention. Air in the atmosphere is pressurized by a fan 10, and mixed with ozone generated by an ozonizer 3. At this time, the flow rate of the air is adjusted by an air flowmeter 9 and a valve 7, whereby an ozone-containing gas 14 having a desired ozone concentration can be obtained. The difference between this embodiment and Embodiment 2 is that air 15 is used as a diluent gas instead of nitrogen.

The flow rate of air 15 is adjusted by the valve 7 under monitoring with the air flowmeter 9. If the concentration of ozone generated by the ozonizer 3 is 200 g/m$^3$, for example, this ozone is mixed with air at a flow rate ratio of 1:1, whereby the ozone concentration can be adjusted to about 100 g/m$^3$.

As described above, the ozone production facilities of the present invention comprise oxygen production facilities as a starting gas supply source, an ozonizer, and an ozone analyzer, and are adapted to supply the starting gas by the oxygen production facilities, ozonize the starting gas by the ozonizer to produce an ozone-containing gas, and monitor the ozone concentration of the ozone-containing gas by the ozone analyzer; the ozone production facilities further including liquid oxygen facilities as another starting gas supply source, and an oxygen flowmeter for monitoring the flow rate of oxygen supplied by the liquid oxygen facilities. Thus, when the consumption of oxygen is within the production capacity of the oxygen production facilities, the starting gas can be supplied from the oxygen production facilities alone to the ozonizer; or when the consumption of oxygen exceeds the production capacity of the oxygen production facilities, pure oxygen gas from the liquid oxygen facilities is mixed with the gas from the oxygen production facilities to form a mixed gas, and this mixed gas can be fed as the starting gas to the ozonizer. Even if the oxygen consumption fluctuates throughout the year, therefore, oxygen can be supplied stably, and a high ozone concentration can be maintained. Furthermore, the capacity of the oxygen production facilities need not be adapted to the maximum consumption of oxygen in the year, thus achieving a cut in the facilities cost.

In addition, the ozone production facilities of the present invention can use part of the nitrogen, exhausted from the oxygen production facilities, or air as a diluent gas. Thus, the inventive facilities enable a single ozonizer to feed high concentration ozone necessary for sewage disposal and pulp bleaching, and low concentration ozone necessary for treatment of water supplies to make them drinkable.

The present invention has been described in detail with respect to the preferred embodiments, and it will now be clear that changes and modifications may be made without departing from the invention in its broader aspects, and it is our intention, therefore, in the appended claims to cover all such changes and modifications as fall within the true spirit of the invention.

What is claimed is:

1. A method of operating an ozone production facility comprising the steps of:

supplying a starting gas from an oxygen production facility to said ozone production facility;

mixing a pure oxygen gas from a liquid oxygen facility with said starting gas when consumption of oxygen by said ozone production facility exceeds a production capacity of said oxygen production facility;

measuring a concentration of oxygen in the mixed starting and pure oxygen gases input to an ozonizer;

monitoring and adjusting a flow rate of said pure oxygen gas to control the concentration of oxygen in said mixed gases;

ozonizing said mixed gases to produce an ozone-containing gas; and analyzing an ozone concentration of said ozone containing gas by means of an ozone analyzer.

2. The method according to claim 1, further comprising the steps of:

mixing nitrogen gas exhausted from said oxygen production facilities with said ozone containing gas; and monitoring and adjusting the flow rate of said nitrogen gas to control the concentration of ozone in said ozone containing gas.

3. The method according to claim 2, wherein the oxygen concentration of the starting gas is set at 95±5%, when the starting gas is supplied by the oxygen production facilities alone.

4. The method according to claim 2, wherein the oxygen concentration in the mixed starting and pure oxygen gases of input to said ozonizer is set at 95±5%.

5. The method according to claim 1, further comprising the steps of:

pressurizing atmospheric air;

mixing said pressurized air with said ozone containing gas; and monitoring and adjusting a flow rate of said pressurized air to control the concentration of ozone in said ozone containing gas.

6. The method according to claim 5, wherein the oxygen concentration of the starting gas is set at 95±5%, when the starting gas is supplied by the oxygen production facilities alone.

7. The method according to claim 5, wherein the oxygen concentration in the mixed starting and pure oxygen gases of input to said ozonizer is set at 95±5%.

8. The method according to claim 1, wherein the oxygen concentration of the starting gas is set at 95±5%, when the starting gas is supplied by the oxygen production facilities alone.

9. The method according to claim 1, wherein the oxygen concentration in the mixed starting and pure oxygen gases of input to said ozonizer is set at 95±5%.

* * * * *